June 30, 1953  G. E. DATH  2,643,876
FRICTION SHOCK ABSORBER FOR RAILWAY CAR TRUCKS
Filed May 12, 1950
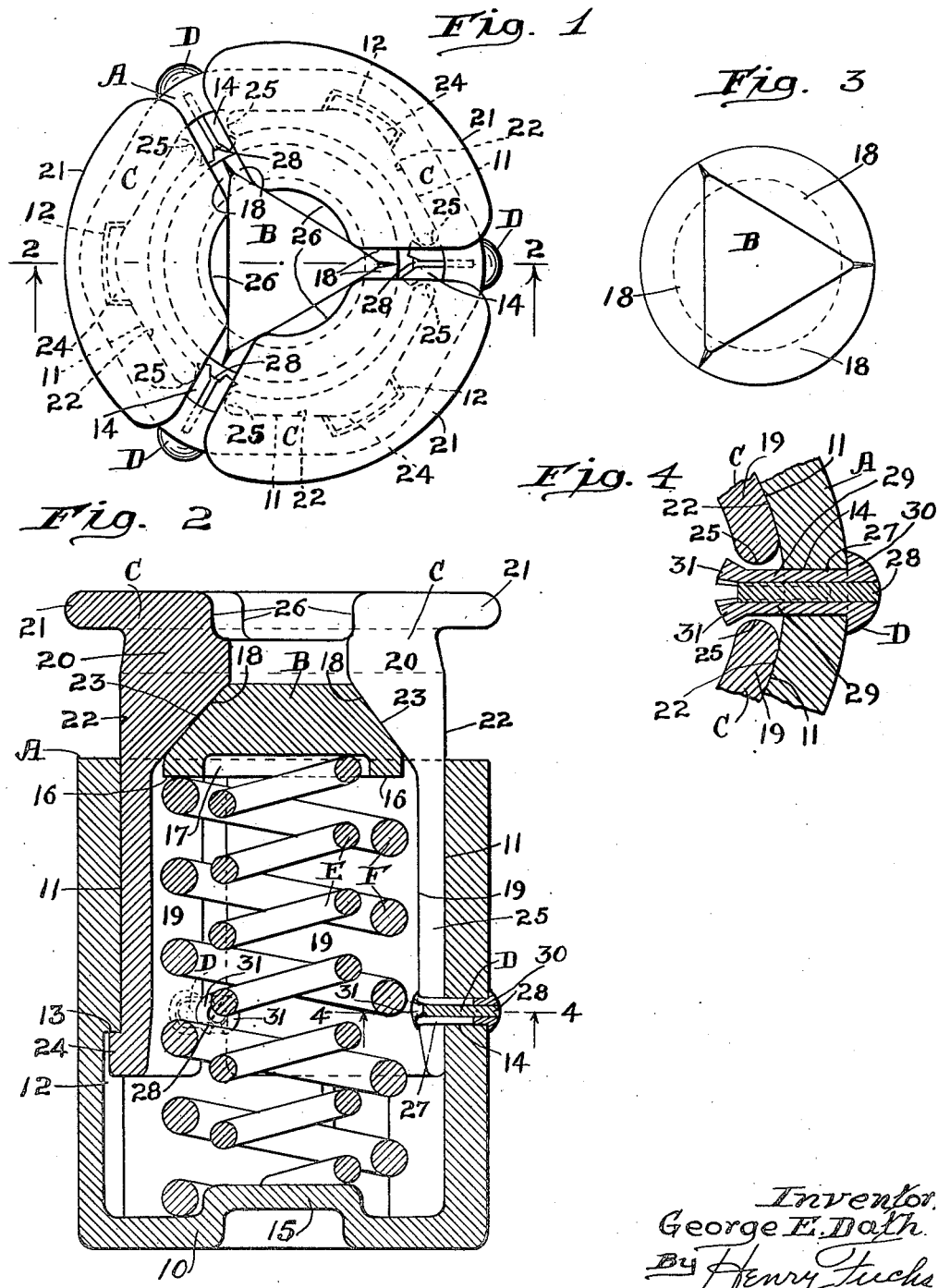
Inventor.
George E. Dath
By Henry Fuchs
Atty.

Patented June 30, 1953

2,643,876

UNITED STATES PATENT OFFICE 2,643,876

FRICTION SHOCK ABSORBER FOR RAILWAY CAR TRUCKS

George E. Dath, Mokena, Ill., assignor to W. H. Miner, Inc., Chicago, Ill., a corporation of Delaware Application May 12, 1950, Serial No. 161,685

3 Claims. (Cl. 267—9)

1

This invention relates to improvements in friction shock absorbers especially adapted for use in connection with railway car truck springs for snubbing or dampening the action of the same.

One object of the invention is to provide a friction shock absorber for snubbing the action of railway car truck springs, comprising a friction casing, friction shoes slidingly telescoped within the casing and receiving the actuating force, a combined wedge and spring follower in wedging engagement with the shoes near the outer ends thereof, and a spring resistance within the casing yieldingly opposing inward movement of the shoes, wherein means is provided for preventing collapse of the inner ends of the friction shoes.

Another and more specific object of the invention is to provide a friction shock absorber as set forth in the preceding paragraph, wherein the means for preventing collapse of the inner ends of the shoes comprises a plurality of removable guide members fixed to the casing and extending between adjacent shoes to maintain the same spread apart circumferentially of the casing.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, corresponding substantially to the line 2—2 of Figure 1. Figure 3 is a top plan view of the combined wedge and spring follower member of my improved mechanism. Figure 4 is a broken, horizontal sectional view, on an enlarged scale, corresponding substantially to the line 4—4 of Figure 2.

As shown in the drawing, my improved shock absorber comprises broadly a friction casing A, a combined wedge and spring follower member B, three friction shoes C—C—C, removable guide pins D—D—D, and springs E and F.

The casing A is in the form of a tubular member of hexagonal, horizontal cross section, open at its top end and having a transverse wall 10 closing the bottom end thereof. The interior of the casing A presents three lengthwise extending friction surfaces 11—11—11 of V-shaped, transverse cross section, each surface 11 being formed by two adjacent interior walls of the hexagonal casing. At three alternate corners of the hexagonal casing A, the same is provided with vertical guide slots 12—12—12, which extend upwardly from the bottom of the casing and terminate inwardly of the upper end of said casing, the upper end wall of the slot 12 providing a horizontal stop shoulder 13 for a purpose hereinafter described.

2

These guide slots 12 are located at the corners of the casing A corresponding to the corners formed by the meeting faces of the three friction surfaces 11—11—11 of said casing. At the remaining alternate corners of the casing, the walls of the same are provided with openings 14—14—14 therethrough, adapted to accommodate the removable guide pins D—D—D.

The bottom wall 10 of the casing is provided with an upstanding, central boss 15, which is hollow, and presents a downwardly opening seat, adapted to receive the usual spring centering projection of the bottom follower plate of a cluster of truck springs.

The combined wedge and spring follower member B is in the form of a block, having a flat, transverse, bottom end face 16, provided with a central depression or seat 17. The upper end portion of the member B is provided with three upwardly converging, flat wedge faces 18—18—18. The wedge faces 18—18—18 are arranged symmetrically about the central longitudinal axis of the casing A and have wedging engagement with the shoes C—C—C.

The friction shoes C are three in number and are slidingly telescoped within the casing A. The shoes C—C—C are interposed between the combined wedge and spring follower member B and the V-shaped, interior friction surfaces 11—11—11 of the casing. Each shoe C comprises a relatively heavy, platelike section 19 of V-shaped, transverse cross section, and an inward enlargement or head 20 at the upper end of the section 19. At the top thereof, the head 20 of each shoe presents a laterally outwardly projecting, horizontal flange 21, overhanging the upper end of the casing A and adapted to engage therewith to restrict movement of the shoe inwardly of the casing. On the outer side, each shoe C presents a lengthwise extending friction surface 22 of V-shaped, transverse cross section, slidingly engages with the corresponding friction surface 11 of the casing A. The inner side of the head 20 of each shoe presents a downwardly facing, substantially flat wedge face 23, engaged with the corresponding flat wedge face 18 of the member B. At the bottom end, each shoe C has a laterally outwardly projecting, central stop lug 24, guided in the corresponding slot 12 of the casing A and engageable with the shoulder 13 of said slot to limit outward movement of said shoe with respect to the casing. The opposite side edges of each shoe C, which side edges are indicated by 25—25, are substantially straight lengthwise of the shoe and rounded transversely, as shown most clearly in Figure 4.

The shoes C—C—C are recessed at their inner sides at the upper ends, as indicated at 26—26—26, to provide a seat for the usual spring centering lug of the top spring follower plate of a cluster of truck springs.

The guide pins D—D—D are engaged through the openings 14—14—14 of the walls of the casing A and protrude inwardly beyond said walls, projecting between adjacent shoes, as clearly shown in Figures 1 and 4, to guide the lower ends of said adjacent shoes and maintain said shoes spread apart at their lower ends, thus preventing circumferential contraction of the unit formed by the three shoes and thereby holding the lugs 24—24—24 of said shoes in position to engage the shoulders 13—13—13 of the casing A. As illustrated, each guide pin D is preferably in the form of an expandible member, comprising a tubular outer section 27 and a cylindrical, central spreading rod 28. The tubular outer section 27 is split lengthwise at its inner end to provide fingers 29—29, which may be spread apart. The section 27 is provided with a head 30 at its outer end, and with laterally flaring portions 31—31 at the inner ends of the fingers 29—29.

The springs E and F are arranged within the casing A between the member B and the bottom wall 10 of the casing. Each spring E and F is in the form of a helical coil, and the spring F surrounds the spring E. The spring E has its bottom end bearing on the top side of the boss 15 of the wall 10 of the casing A and has its top end engaged in the seat 17 of the member B. The spring F has its top and bottom ends bearing, respectively, on the bottom face 16 of the member B and the top side of the wall 10 of the casing A, being seated over the boss 15.

In assembling the mechanism, the springs E and F and the combined wedge and spring follower member B are first placed within the casing A by insertion of the parts through the open top of said casing. The shoes C—C—C are then inserted around the member B and spread apart to engage the lugs 24 of said shoes in the slots 12 of the casing, beneath the stop shoulders 13. The guide pins D—D—D are then applied through the openings 14—14—14 of the casing A and engaged between adjacent shoes to maintain the lower ends of said shoes laterally spread apart, each pin being locked in position in a well-known manner, by its spreading rod 28.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes C—C—C are forced downwardly with respect to the casing A, against the spring resisted, combined wedge and spring follower member B. The shoes are thus wedged apart by the member B into tight frictional engagement with the friction surfaces of the casing. High frictional resistance is thus provided during movement of the shoes to snub the action of the truck springs. Upon recoil of the truck springs, the expansive actions of the springs E and F return all of the parts to the normal position shown in Figure 2.

I claim:

1. In a friction shock absorber, the combination with a casing open at one end, said casing having interior friction surfaces; of a unit, composed of a plurality of friction shoes telescoped within the casing in sliding engagement with the friction surfaces thereof; a combined wedge and spring follower member in wedging engagement with the outer ends of the shoes; removable pins secured to said casing and extending between adjacent shoes engageable by the opposite side edges of adjacent shoes to limit circumferential contraction of said unit and thereby restrict inward tilting of said shoes of the latter at the lower ends thereof; and spring means within the casing bearing on said member to yieldingly oppose inward movement thereof.

2. In a friction shock absorber, the combination with a casing open at one end, said casing having interior friction surfaces; of a unit, composed of a plurality of friction shoes telescoped within the casing in sliding engagement with the friction surfaces thereof; a combined wedge and spring follower member in wedging engagement with the outer ends of the shoes; detachable guide pins engaged through the walls of said casing and projecting between adjacent shoes engageable by the opposite side edges of adjacent shoes to limit circumferential contraction of said unit and thereby restrict inward tilting of said shoes of the latter at the lower ends thereof; and spring means within the casing bearing on said member to yieldingly oppose inward movement thereof.

3. In a friction shock absorber, the combination with a casing open at one end, said casing having interior friction surfaces; of a unit, composed of a plurality of friction shoes telescoped within the casing in sliding engagement with the friction surfaces thereof; a combined wedge and spring follower member in wedging engagement with the outer ends of the shoes; means for guiding said shoes in their movement lengthwise of the casing and maintaining the same spaced laterally apart, comprising pins engaged through the walls of the casing and projecting between adjacent shoes engageable by the opposite side edges of adjacent shoes to limit circumferential contraction of said unit and thereby restrict inward tilting of said shoes of the latter at the lower ends thereof; and spring means within the casing bearing on said member to yieldingly oppose inward movement thereof.

GEORGE E. DATH.

References Cited in the file of this patent

UNITED STATES PATENTS

| Number | Name | Date |
|---|---|---|
| 754,670 | Miner | Mar. 15, 1904 |
| 1,026,113 | O'Connor | May 14, 1912 |
| 1,255,238 | Sherman | Feb. 5, 1918 |
| 2,198,261 | Barrows et al. | Apr. 23, 1940 |
| 2,238,220 | Gallagher | Apr. 15, 1941 |
| 2,276,228 | Cottrell | Mar. 10, 1942 |
| 2,306,398 | Light | Dec. 29, 1942 |
| 2,429,672 | Dath | Oct. 28, 1947 |